April 16, 1929.   W. F. BEATTY   1,709,516
ICE CREAM MANUFACTURING AND DISPENSING APPARATUS
Filed April 5, 1926   3 Sheets-Sheet 2

William F. Beatty,
Inventor:
By John Elias Jones,
Atty.

April 16, 1929.    W. F. BEATTY    1,709,516
ICE CREAM MANUFACTURING AND DISPENSING APPARATUS
Filed April 5, 1926    3 Sheets-Sheet 3
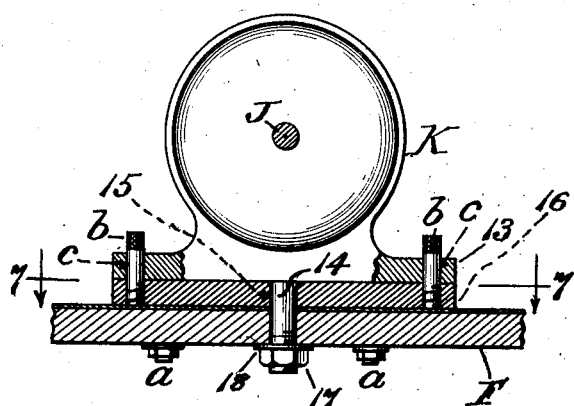
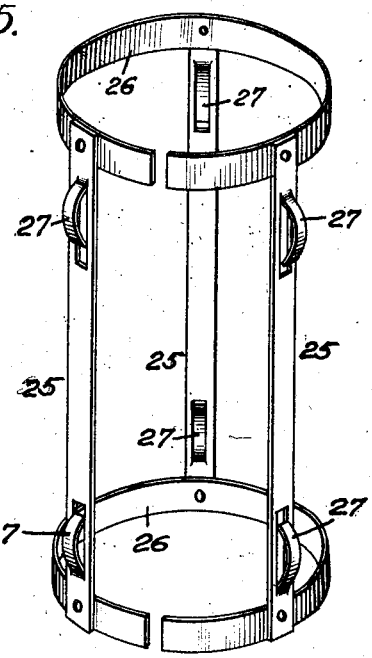
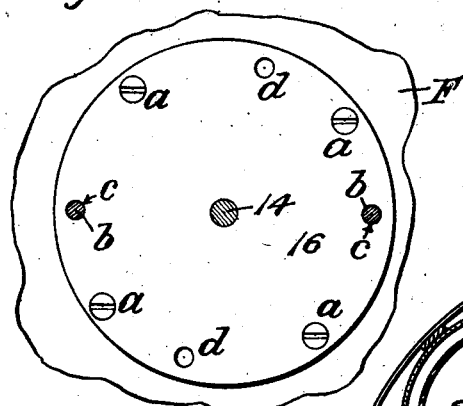
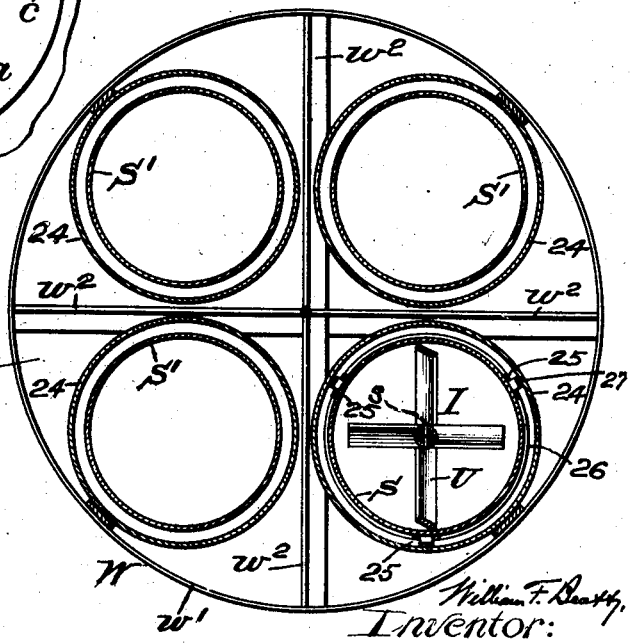
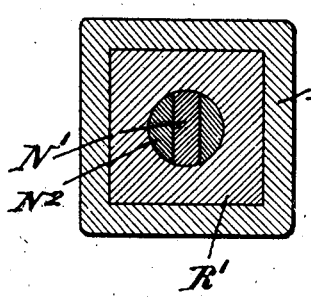

Patented Apr. 16, 1929.

1,709,516

UNITED STATES PATENT OFFICE.

WILLIAM F. BEATTY, OF CINCINNATI, OHIO.

ICE-CREAM MANUFACTURING AND DISPENSING APPARATUS.

Application filed April 5, 1926. Serial No. 99,882.

This invention relates to ice-cream making and dispensing apparatus and, more particularly, to cabinets for convenient and economical use in the miscellaneous making and service of ice-cream and other similar food products in a single mechanically-refrigerated cabinet.

Figure 1:
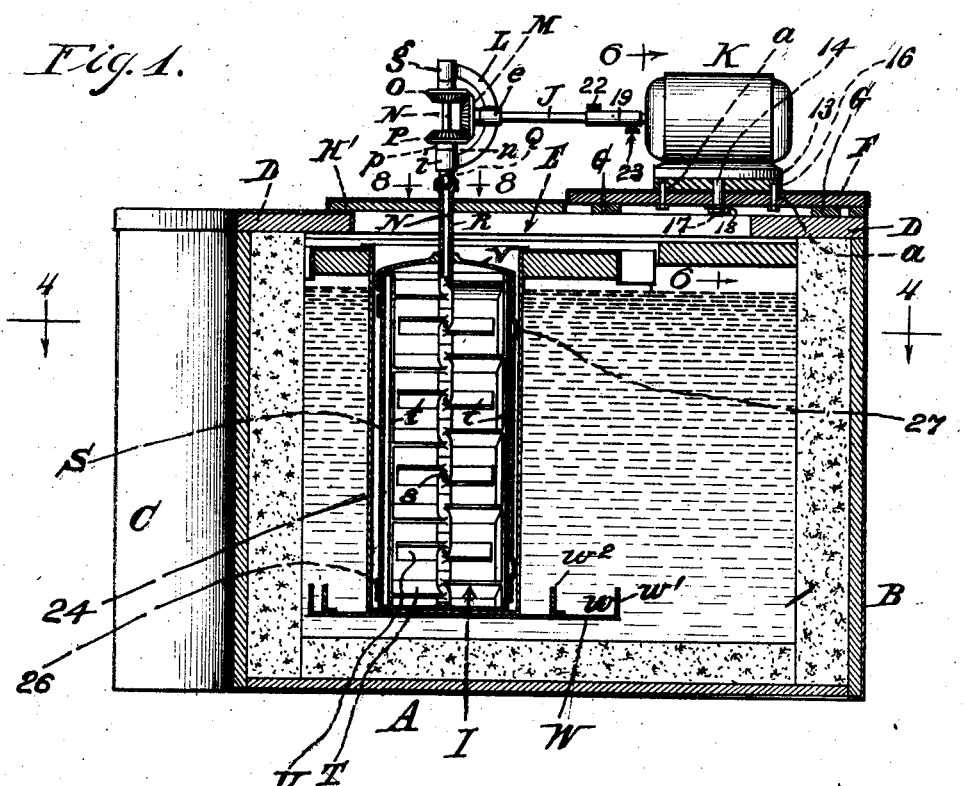
Figure 2:
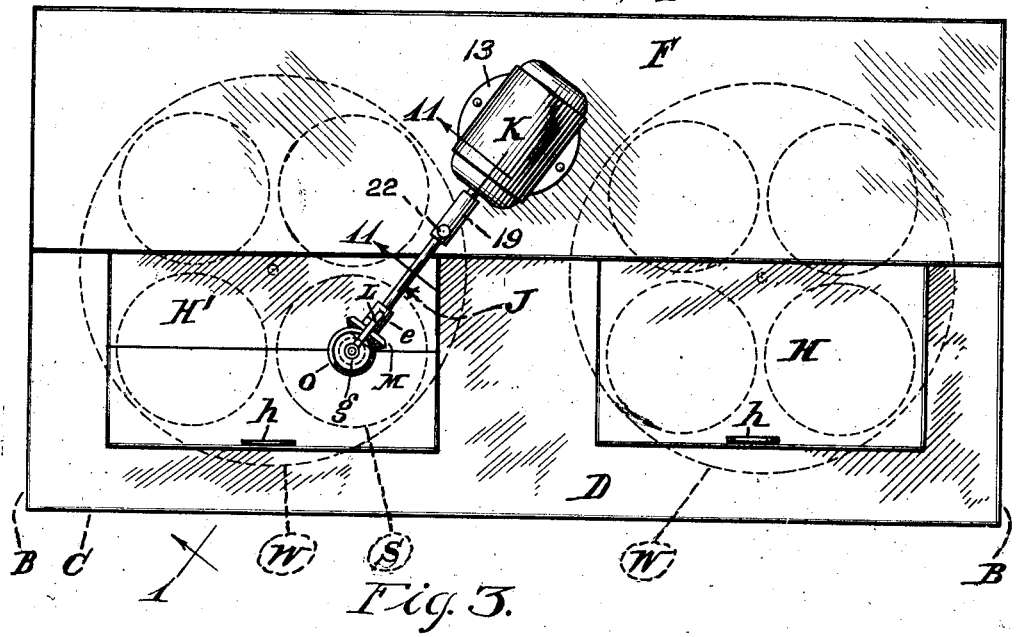
Figure 3:
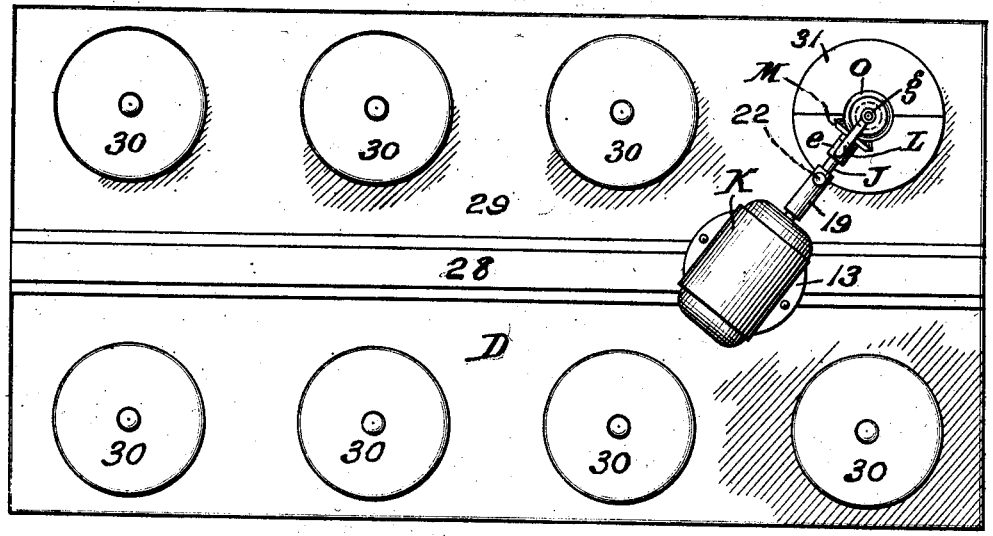

The improvements herein will be readily understood from the following clear and exact description, taken in connection with the accompanying several sheets of drawings, in which Figure 1 is a sectional elevation taken on the diagonal line 1, 1, of Fig. 2, but leaving the auxiliary swivel power attachment in elevation; Fig. 2, a plan of the cabinet embodying my invention in one approved form in which the auxiliary swivel power-attachment is mounted at the middle portion of the rear top-slab of the cabinet and in working-position in connection with one of an inclosed cluster of four cans that are shown, dotted, and on a dotted turn-table; Fig. 3, still another plan of the cabinet, but showing the said auxiliary swivel power-attachment portably-mounted on a central, longitudinal track that provides a very convenient, longitudinal guide support for the said swivel power-attachment to adapt it to operating-action in connection with a double row of freezer-cans; Fig. 4, a sectional plan, taken on the line 4, 4, of Fig. 1, including the freezer-can that is under ice-cream working-action, with the cream working-dasher shown therein; Fig. 5, a perspective view of one of the can-supporting skeleton-frames that are suitably mounted on a horizontal plane or turntable within the mechanically-refrigerated chamber; Fig. 6, a fragmentary sectional elevation (taken on the vertical line 6, 6, of Fig. 1) showing the said rear top-slab and the auxiliary power device or motor mounted thereon, the manner of so mounting said motor being thus clearly brought to view for disclosing how it may be adjusted or set to suit the relative diagonal position of the ice-cream can to be operated upon, (to the left or the right of the center of the cabinet top, as conditions may be at the time); Fig. 7, a fragmentary plan of the said rear slab and motor mounting-plate, taken on line 7, 7, of Fig. 6; Fig. 8, a horizontal section, taken on the line 8, 8, of Fig. 1, but on a somewhat larger scale, to show the coupling-member between the dasher-spindle and the vertical shaft of the special form of miter-gear transmission that is used in connection with the power-motor for driving the alternate series of dasher-blades in opposite directions in the freezer-can that is under working-operation by said motor; Fig. 9, a vertical section of the miter-gear device, seen in Fig. 1, for transmitting the power from the motor to the dasher devices in the work-can in opposite directions, this view being on a somewhat larger scale than that of Fig. 1; Fig. 10, a horizontal section, taken on the line 10, 10, of Fig. 9, but on a somewhat larger scale, and omitting the vertical yoke or frame in which the miter-gear is mounted and journaled; Fig. 11, a longitudinal section of the slidable coupling-sleeve used on the jointed portion of the horizontal driving-shaft extending from the motor for communication with the said miter-gear dasher mechanism, the said driving-shaft being shown broken off just beyond the opposite ends of the said coupling-sleeve; and Fig. 12, a transverse sectional elevation of the coupling-sleeve and driving-shaft of the motor, taken on the line 12, 12, of Fig. 11, to clearly show the spline-structure.

The cabinet itself is ordinarily of oblong or elongated rectangular form, as best seen in Figs. 1, 2 and 3, and has a bottom A; end-walls B, B; front-wall C, (broken away in Fig. 1); a back-wall (not seen); and a top or cover D that is made in a number of convenient parts that will be duly designated hereinafter in connection with their distinctive uses.

The top-proper or closure-member D is mounted on the end, the front and rear walls, aforesaid, of the cabinet, in any ordinary manner, and it has an opening or orifice E at both sides of the middle thereof for convenient man-hole purposes in the placing of the internal can-supports and the mechanical refrigerating-devices and fluid within, and for access, as a matter of course and expedience, to the interior for service of the products. A slab-member F is mounted on the rear-half of the said top-proper D and rests on slats G, G, that raise it above the level of the said top-proper D, as best seen in Fig. 1; and H, H', indicate a pair of vertically-removable lids having handles h, h, for closing the said orifices E in the top-proper D, and otherwise affording convenient access to the interior of the cabinet in the preparation and service of its frozen-product contents, both to and from the said interior.

The one H of the said lids H, H', (to the left-hand in Fig. 2) is a two-part or split one that is adapted to be placed, however, in either of the orifices E, instead of a single-piece lid, so as to allow for the ready introduction and presence of the dasher-devices I into the cream-can that is in use for the making of the frozen food-product.

It will be readily seen that the power-device is connected up with the second fore-can from the left-end of the cabinet, such position being deemed the best one for making the most direct and steady, as well as the shortest extension of the driving-shaft J from the power-device K that, in this instance, is in the nature of an ordinary electric-motor. The said electric-motor has a base-member 13 having a central swivel bolt or pin 14 that extends downwardly through an opening 15 in the center of the plate or disk 16, and a nut 17 is applied to the threaded lower end of the said pin 14 for securing the motor in adjusted position, but free to turn horizontally, a small fraction of a revolution, on the said plate 16, due to the presence of the washer 18, and just sufficient, however, to allow for the swinging of the said motor to the right, or to the left, as may be necessary, to suit the side it is to be used on in driving the dasher-devices in the preliminary preparation-can for the initial making of the frozen food-product.

The said motor-shaft J is divided into two parts that are detachably-coupled together by means of a long sleeve 19, as best seen in Fig. 11; but also well shown in Fig. 12 wherein a spline-formation of a pair of aligned internal tongues or ribs 20 is provided that engage longitudinal, aligned grooves 21 made in the adjacent parts of the joint-portion of the motor-shaft J. Set-screws 22 and 23 are used in the sleeve 19 to hold the coupled parts of the shaft-joint together in a longitudinally-extensible manner, to suit the relative distances between the said motor and the preliminary work-can to be acted upon.

The plate or disk 16 is detachably-secured to the raised slab-member F of the top-proper D by means of the screw-bolts $a$, and a pair of upright post-members $b$ extends from the upper face of the said disk, as best seen in Fig. 6, for free engagement with holes $c$ in the said base 13 of the motor K in setting the latter in varied aligned place to suit the angle of the extended shaft J in relation to the preliminary working-can in the cabinet, be it to the left of the center (as in Fig. 2) or to the right of the multiple of workable-cans (as in the track-modified form seen in Fig. 3). Extra holes $d$ are provided in the said disk for interchangeable or additional arrangement of upright post-members $b$ on the disk. The said post-members $b$ assure the steady support of the motor K on the disk in addition to the presence of the center-bolt 14.

Shaft J journals near its outer end in a box $e$ that is located at the center of a vertical arc-shape or semicircular yoke L, as best seen in Figs. 1 and 9, and it has at its said outer end a vertical miter gear M that is secured in place by a transverse pin $f$ within the said yoke.

At the opposite ends of said yoke is an upper journal-box $g$ and a lower journal-box $i$ in perpendicular alignment for the accommodation of the vertical shaft N, an upper horizontal miter gear O being secured by a transverse pin $j$ to the said vertical shaft N and meshing with the said vertical miter gear M, and a similar lower horizontal miter gear P being free to turn on the said shaft N and with its lower hub-portion $p$ rotating on the upper face $n$ of the said lower journal-box $i$ as best seen in Fig. 9. The bore of the said lower journal-box $i$ is somewhat larger than the cross-section of the said shaft N for the accommodation of the upper extended-portion Q of the vertical tubular-member or sleeve-shaft R that surrounds the said shaft N for rotation in a direction opposite to that of the shaft in connection with the dasher-devices I in the freezer working-can S below.

Said upper extended-portion Q of the sleeve R has both a rotary and a vertically-longitudinal bearing in the said lower journal-box $i$ and is provided with vertical grooves $q$ for engagement with tongue-formations $r$ in the bore of the said gear hub $p$ for coupling the lower miter gear P with the said extended upper portion Q of the sleeve or hollow shaft R and thereby communicate power to the latter which carries a vertical series of horizontal dasher-blades T that alternate with a vertical series of similar dasher-blades U within the said work-can S for the usual mixing and smoothing action on the cream during the freezing process. The shaft N extends forwardly through all the central hubs of the two sets of said dasher-blades T and U, but is secured to the dasher-blades U only, horizontal pins $s$ being used (as best seen in Fig. 4) to do the same. The dasher-blades T are coupled in vertical alignment by means of a pair of vertical bars $t, t$, at their opposite ends, and the lower end of the shaft N has a central bearing in the bottom of said work-can. A cover or cap V is used on the said work-can and is provided with a central orifice for the admission and due journaling of the shaft-sleeve R below the split-lid H' within the cabinet.

In order that the said sleeve R shall positively turn independent of and around the shaft N its upper end is made square, as best seen at R' in Fig. 8, and adapted to engage a similar square socket R² that is made integral at the lower end of the said upper extended-portion Q, and the said upper extended-portion Q is further adapted to be slid upwardly away from the said coupling-engagement with the lower sleeve-member R, owing to the aforesaid tongue and groove formations $q$ and $r$, whereby, also, the motor device is freed from the work-can below and ready for swinging its drive-shaft portion over to the other side of the center of the cabinet where another fresh work-can is placed for action on its previously prepared unfrozen contents and with the split-lid duly transferred from the first used opening in the cabinet-top-proper D and thus leaving the previously used dasher-devices to be removed from the already worked can which is then immediately left to further harden and set for service.

It will be seen in Fig. 8 how the lower end of the extended upper portion of the shaft N is narrowed and formed into a tongue N' that engages a notched upper extremity $N^2$ of the lower main-part of the shaft whereby power from the motor is communicated to the dasher devices below and, also, whereby the motor-shaft devices can be readily separated from the said dasher or cream-working devices when one freezing operation is completed and another to be done. The coupling-sleeve 19 and the set-screws 22 and 23 of the motor device are duly adjusted in the exchange of motor and dasher devices from a worked to an unworked can, all of which is very conveniently and easily accomplished.

In order to sustain the work-can in position in the encasing-jacket 24 a skeleton frame or handy-insert of vertical bars 25 and connecting bands or rings 26 is used for receiving said work-can when delivered in its initial state, with its prepared contents in place, and bow-springs 27 are bulged or extended from said vertical bars 25 to impinge against the inner face of the said jacket, whereby the said work-can does not contact with the said inner surface of the jacket to become clogged or frozen therein and unfree to withdraw the said skeleton frame from within that jacket and ready for transfer to another jacket and work-can for the next dasher and freezing operation. Said springs 27 enable a very pliable surface between the finished can of frozen cream and the surrounding jacket for facilitating the withdrawal of the said can when desired.

I prefer to use a rotatable tray or circular-platform W in the cabinet, at each side of its center, as incidentally shown in dotted lines in Fig. 2, and shown singly in Figs. 1 and 4, such tray being of the type referred to above, in connection with my pending application for patent, at the beginning of this specification, and composed, briefly, of a bottom $w$ having a raised rim or flange $w'$, shallow angled stiffening bars or partitions $w^2$ intersecting on said bottom, and a multiple or cluster of upright cylinders forming cream-can jackets 24, one of such jackets having been referred to above in connection with the work-can under previous description. Service-cans S' are shown in each jacket 24 in Fig. 4.

The details of mounting-structure in connection with the said rotatory-tray will not be necessary herein as they do not constitute any essential part of the invention except that part of it which refers to the handling and storage of the finished product within the cabinet that is intended to combine convenience in both preparing and handling the frozen product in the one cabinet that is located in the desired or chosen place for active and actual service, especially for the merchant who has a mechanically-refrigerated cabinet and needs but to order his "mix" ready to freeze and serve from the same delivery can, whereby the customer is assured 100% ice cream and eliminating the so-called or at least somewhat well-known adulteration or imposition of 25% air that is frozen in the product of the larger ice-cream producers or manufacturers.

It is obvious that this improvement is and will be a great saving in the manufacture and serving of ice-cream, at least to the extent of 50% of the previous cost in the multiple handling of the cream and its delivery into the many by-ways of manufacturer and customer service.

Further, there is no unnecessary handling of the frozen product, except from the cabinet herein described and shown, to the customer direct, and as the shipping of frozen products to distant points or towns is thus eliminated on account of dealers having their own cabinets made as herein provided, the saving of such shipping costs is decidedly made.

The track-structure seen in Fig. 3 is a convenient modified form to which my invention is well adapted. In that view, the track 28 is laid along the longitudinal center of a removable cabinet-top 29 that has a double series of parallel lids 30 that cover beneath them a corresponding number of ice-cream cans adapted to the working of the cream "mix" and the storage-hardening, and the service being the same as in the device first-above described. The motor K is shifted along said track to suit its relative position with a work-can inside the cabinet. A split lid 31 is used in the opening leading to the work-can under action by the motor.

I claim:—

1. An ice-cream making-and-service combination-cabinet comprising, in combination, a freezing-chamber having a suitable cover or top, a plurality of jacketed product-container cans provided independent of each other in the said freezing-chamber and surrounded by a mechanically-refrigerated liquid solution or brine, removable cream-mixture working-means adapted for insertion in any selected one of said cans, lid-topped access-orifices to said cans provided in the said cover or top, and a swivel-power motor removably mounted on the middle of said cover or top and provided with an extensible driving-shaft that is adapted to be detachably coupled or connected at its outer end with gear propelling-mechanism on the said cream-mixture working-means, whereby the said selected one of the container-cans with said removable cream-mixture working-means may be applied in use for the operating-action of the said swivel-power motor in each initial making of the frozen product directly from the original supply-mixture while other cans in the said mechanically-refrigerated chamber are in already similarly worked ice-cream hardening and serving position in the same freezing-chamber, substantially as shown and described.

2. In a combination ice-cream making-and-serving cabinet provided with mechanical-refrigeration, a multiple of frozen-product removable container-cans within the cabinet, a cover on the cabinet arranged over its freezing-chamber and having a multiple of lid-covered access-orifices therein that align with the said respective removable container-cans, a track provided along the longitudinal center of said cover with a series of lid-covered orifices at both sides thereof, a swivel power-motor mounted on the said track having an extensible drive-shaft, a dasher-means adapted to be inserted in either of said orifices along the track and the aligned unworked can beneath for the making of the frozen-product, and drive-connections between said motor drive-shaft and the dasher-means for actuating the latter, substantially as shown and described.

In testimony whereof I have hereunto affixed my signature.

WILLIAM F. BEATTY.